(12) United States Patent
Beitia et al.

(10) Patent No.: US 10,718,614 B2
(45) Date of Patent: Jul. 21, 2020

(54) INERTIAL NAVIGATION SYSTEM WITH IMPROVED ACCURACY

(71) Applicant: Innalabs Limited, Dublin (IE)

(72) Inventors: Jose Beitia, Ratoah (IE); Alain Renault, Le Cannet (FR); Isaak Okon, Brooklyn, NY (US)

(73) Assignee: Innalabs Limited, Dublin (IE)

(*) Notice: Subject to any disclaimer, the term of this patent is extended or adjusted under 35 U.S.C. 154(b) by 222 days.

(21) Appl. No.: 15/780,853

(22) PCT Filed: Nov. 28, 2016

(86) PCT No.: PCT/EP2016/078957
§ 371 (c)(1),
(2) Date: Jun. 1, 2018

(87) PCT Pub. No.: WO2017/093166
PCT Pub. Date: Jun. 8, 2017

(65) Prior Publication Data
US 2018/0356226 A1    Dec. 13, 2018

(30) Foreign Application Priority Data
Dec. 4, 2015  (FR) ...................................... 15 61888

(51) Int. Cl.
*G01C 19/38*  (2006.01)
*G01C 21/18*  (2006.01)

(52) U.S. Cl.
CPC ............. *G01C 19/38* (2013.01); *G01C 21/18* (2013.01)

(58) Field of Classification Search
CPC ................................ G01C 19/38; G01C 21/18
USPC .................................................. 33/324, 326
See application file for complete search history.

(56) References Cited

U.S. PATENT DOCUMENTS

| | | | |
|---|---|---|---|
| 3,509,765 A | | 5/1970 | Stevenson, Jr. et al. |
| 4,071,959 A | * | 2/1978 | Russell ................. E21B 47/022 33/312 |
| 4,270,387 A | * | 6/1981 | Hoffman ................. G01C 19/04 318/648 |
| 4,292,854 A | * | 10/1981 | Liebing ................. G01C 21/16 33/321 |

(Continued)

OTHER PUBLICATIONS

International Search Report dated Feb. 22, 2017.

*Primary Examiner* — George B Bennett
(74) *Attorney, Agent, or Firm* — Ipsilon USA, LLP (57) ABSTRACT

The invention relates to an inertial navigation system for a carrier comprising a core comprising gyroscopic sensors making it possible to determine the angular velocity thereof according to three axes defining a reference trihedron, two of the axes defining a reference plane and the third axis being at right angles to this plane. The device comprises command and control means making it possible to rotate the core about the third axis and to determine the direction of the geographic north on the basis of the information supplied by the gyroscopic sensors and by an accelerometer placed in the reference plane; the rotation of the core being performed with a period for which the value of the Allan variance of the stability error of the gyroscopic sensors is lower than a given value guaranteeing the accuracy with which the direction of the geographic north can be known.

8 Claims, 3 Drawing Sheets

(56) References Cited

U.S. PATENT DOCUMENTS

| | | | | |
|---|---|---|---|---|
| 4,686,771 | A * | 8/1987 | Beveventano | G01C 19/38 33/324 |
| 4,945,647 | A * | 8/1990 | Beneventano | G01C 19/38 33/318 |
| 5,272,922 | A * | 12/1993 | Watson | A44B 18/0049 33/318 |
| 5,396,326 | A * | 3/1995 | Knobbe | G01C 21/16 33/321 |
| 5,778,543 | A * | 7/1998 | Schneider | G01C 19/38 33/318 |
| 7,561,947 | B2 * | 7/2009 | Bonn | B64G 1/286 701/13 |
| 2003/0014874 | A1 * | 1/2003 | Brunstein | G01C 21/16 33/318 |
| 2006/0090358 | A1 * | 5/2006 | Campbell | G01C 23/005 33/356 |
| 2007/0245826 | A1 | 10/2007 | Cardarelli | |
| 2010/0256907 | A1 | 10/2010 | Bye | |
| 2013/0238280 | A1 | 9/2013 | Kagan et al. | |
| 2013/0312518 | A1 * | 11/2013 | Renault | G01C 19/5691 73/504.08 |
| 2015/0338215 | A1 * | 11/2015 | Srinivasan | G01C 9/10 33/365 |

\* cited by examiner

INERTIAL NAVIGATION SYSTEM WITH IMPROVED ACCURACY

RELATED APPLICATION

This application is a National Phase of PCT/EP2016/078957, filed on Nov. 28, 2016, which claims the benefit of priority from French Patent Application No. 15 61888, filed on Dec. 4, 2015, the entirety of which are incorporated by reference.

CONTEXT OF THE INVENTION—PRIOR ART

The present invention relates to the inertial systems that make it possible to define a heading, the attitude, the coordinates and the speed of a carrier.

These systems are built on the basis of gyroscopes or gyrometers and accelerometers. These various sensors are generally referred to by the generic term of inertial sensors.

A gyroscope is a sensor capable of detecting absolute rotations relative to the stars according to an input axis.

A gyrometer is a sensor capable of detecting absolute rotation speeds relative to the stars according to an input axis.

An accelerometer is a sensor capable of detecting specific accelerations relative to the stars according to an input axis.

Gyrometers and gyroscopes are constructed on the basis of the properties of spinning tops or vibrating elements for mechanical sensors or on the basis of the Sagnac effect for optical sensors such as laser gyroscopes or fiber optic gyrometers.

There are gyroscopes and gyrometers which have several input axes. There are other gyroscope and gyrometer technologies.

Gyrometers are mechanical and are built around a seismic mass slaved to be kept at the center of an air gap using an electromagnetic or electrostatic motor, the control of the motor being the image of the specific acceleration.

There are mechanical accelerometers for which the seismic mass is not slaved in terms of position.

There are accelerometers for which the seismic mass exerts a pulling/compressing force on a vibrating plate, and the trend of the frequency of this plate is the measurement of the acceleration.

There are also other accelerometer technologies.

In the following figures, these sensors are simply represented by their measurement input axis.

Gyrometers and gyroscopes are mainly characterized by their false zero. It is called drift and it represents the output value of the sensor for a zero angle (case of the gyroscope) or zero angular velocity (case of the gyrometer) input.

This drift is variable over time and can be considered as a noise that is normally characterized according to the curve of Allan variance.

Similarly, the false zero of an accelerometer, called bias, is the output value of the sensor for a zero input acceleration.

This false zero is variable and it is also standard practice to characterize it by its Allan variance curve.

These inertial systems making it possible to define a heading, the attitude, the coordinates and the speed of a carrier are well known in the prior art through so-called "gimbal" embodiments or through so-called "strapdown system" embodiments.

Gimbal systems are generally composed of a core bearing three gyroscopes and three accelerometers according to an orthonormal trihedron defining a reference axis system. This core is borne by three or four gimbal axes.

The reference axes are stabilized by the gyroscopic information that makes it possible to establish servocontrol commands driving the gimbal motors. The reference axes are thus maintained according to a predefined orientation whatever the movements of the carrier, to the ready drift of the gyroscopes.

The accelerometers then make it possible to give a particular orientation to this system by keeping two reference axes pointed in the horizontal plane (at right angles to the local vertical).

When that is done, the gyroscopes make it possible to point a horizontal axis toward the geographic north defined by the axis of rotation of the Earth.

The accelerometers in the horizontal plane are also used so as to constitute so-called "Schuler" loops damped using information external to the system, such as, for example, speed information delivered by an electromagnetic log or a Doppler log for a ship or a Pitot head for an airplane.

The accelerometric information makes it possible to compute the movements over the terrestrial globe, thus ensuring the navigation of the vehicle carrying the system.

The angular sensors of the gimbals make it possible to know the attitude of the vehicle and thus deliver information which can be used for the possible piloting thereof.

This information requires the use of gyroscopes and accelerometers that are extremely stable from the moment when the system is calibrated (input of the initial position and speed information) then over all the navigation period.

Different techniques are implemented to minimize the weight of the errors induced by the sensors, such as, for example, a so-called "Schuler" damping loop.

Generally, for these optimized systems, only the errors of the gyroscopes lead to navigation errors which grow with time and for example a stability better than 0.01 degrees per hour will ultimately be necessary to achieve a position error of the order of 1 nautical after one hour of navigation.

The inertial sensor technologies that make this type of performance possible are these days technologies of RLG (gyrolaser) or FOG (fiber optic gyrometer) type for which the manufacturing costs are very high.

For their part, the errors of the accelerometers lead to position errors that are bounded with time and 150 micro g of bias stability are sufficient to generate a position error of 1 nautical.

Here, again, only a few inertial sensor technologies make it possible to achieve these performance levels, such as, for example, top-end servo pendulous accelerometers, for which the manufacturing costs are very high.

Advances in the field of electronic components in general, and of computers in particular (performance, power, cost), have made it possible to eliminate the gimbals and the angular coding equipment of the platforms described above by sampling at a high rate the information from the accelerometers and from the gyroscopes, and by reconstructing, by computation, a stabilized "virtual platform" like those deriving from the gimbal core. These systems are called "strapdown systems". The costs of such navigation systems have indeed decreased, the reliability has indeed increased (fewer mechanical parts and fewer electrical connections), but ultimately these costs remain high because, as for conventional gimbal systems, most of the cost of the system is the result of the cost of the sensors.

SUMMARY OF THE INVENTION

The subject of the present invention relates to the improvement of conventional gimbal systems to obtain top-end navigation performance levels while using sensors of moderate performance (1 to 10 degrees per hour for example for the gyroscope or gyrometer and 1 to 10 mg for the accelerometers), this therefore resulting in a significantly lower system cost.

To this end, the subject of the invention is an inertial navigation system of a carrier, this carrier comprising a core mounted on a tri-axial gimbal system occupying a fixed position relative to the carrier, said core comprising gyroscopic sensors making it possible to determine the angular velocity thereof according to three axes defining a reference trihedron, two of the axes defining a reference plane and the third axis being chosen to be at right angles to said reference plane.

According to the invention, the system further comprises command and control means configured on the one hand to rotate the core continuously or alternately about the third axis and on the other hand to exploit the information supplied by the gyroscopic sensors as well as that supplied by an accelerometer placed in the duly defined reference plane, so as to keep the reference plane of the core in a given attitude relative to the horizontal plane or at least to be able to determine the attitude of the reference plane relative to the horizontal plane and so as to determine the direction of the geographic north in the reference frame formed by the axes defining the reference plane.

According to the invention, also, the continuous or alternate rotation is moreover performed according to a determined period, the value of said period being defined in such a way that, for an observation time equal to this value, the value of the Allan variance of the stability error of the gyroscopic sensors is lower than a given value defined on the basis of the desired accuracy of determination of the geographic north.

According to various arrangements that can be considered separately or, if necessary, in combination with other arrangements, the device according to the invention can comprise certain particular features. Thus, According to a particular feature, the command and control means are configured to exploit the information supplied by the gyroscopic sensors as well as that supplied by an accelerometer placed in the reference plane, so as to determine the attitude of the carrier, its geographic coordinates of longitude and of latitude and of altitude, as well as its speed vector.

According to another feature, the gyroscopic sensors comprise gyroscopes and/or gyrometers.

According to another feature, the two gyroscopic sensors defining the reference plane are oriented according to two right-angled axes such that the duly formed reference trihedron is a trirectangular trihedron.

According to another feature, the command and control means are configured so as to keep the reference plane of the core in the horizontal plane, such that the third axis of the reference trihedron is directed vertically.

According to another feature, one or two gimbal axes are immobilized in rotation. Only the third axis which allows the rotation of the core about an axis at right angles to the reference plane is equipped with an angular coder.

Another subject of the invention is a method for ensuring the inertial navigation of a carrier comprising an inertial navigation system itself comprising a core mounted on a tri-axial gimbal system occupying a fixed position relative to the carrier, said core comprising gyroscopic sensors making it possible to determine the angular velocity thereof according to three axes defining a reference trihedron, two of the axes defining a reference plane and the third axis being chosen to be at right angles to said reference plane.

According to the invention, the core is rotated continuously or alternately, according to a determined period, about the third axis. The continuous or alternate rotation is performed according to a determined period, the value of said period being defined in such a way that, for an observation time equal to this value, the value of the Allan variance of the stability error of the gyroscopic sensors is lower than a given value defined on the basis of the desired accuracy of determination of the geographic north.

According to the invention, also, the information supplied by the gyroscopic sensors as well as that supplied by an accelerometer placed in the reference plane is exploited so as, on the one hand, to keep the reference plane of the core in a given attitude relative to the horizontal plane or at least to be able to determine the attitude of the reference plane relative to the horizontal plane and so as, on the other hand, to determine the direction of the geographic north in the reference frame formed by the axes defining the reference plane.

According to a particular arrangement of the method according to the invention, to determine the attitude of the reference plane relative to the horizontal plane and to determine the direction of the geographic north in the reference plane formed by the axes defining the reference plane, the following operations are performed:

- acquisition of the modulated information delivered by the inertial sensors whose measurement axes are situated in the reference plane and the information supplied by an angular coder coding the rotation of the third axis;
- generation of commands driving the gimbal motors at right angles to the third axis, so as to determine and control the trim of the reference plane and so as to rotate the third axis on the basis of the information from the gyroscopic sensor borne by this axis, said commands being generated on the basis of said information projected using matrices in the axes of rotation of the gimbals;
- determination of the phase and of the amplitude of the modulation of the signals delivered by the gyroscopic sensors and the accelerometer whose measurement axes are situated in the reference plane, the phase of the modulation defining the information on angle of orientation of the measurement axes relative to the geographic north, the amplitude of the modulation defining the information on local latitude angle, the speeds according to the local meridian as well as the local parallel and, by integration, the movements in these directions;
- computation of the trim of the carrier, based on the data from the angular coders of the gimbal axes.

DESCRIPTION OF THE FIGURES

The invention will be better understood on studying FIGS. 1 to 4 which represent FIG. 1, an example of a platform with three gimbal axes.

DETAILED DESCRIPTION

Figure 1:
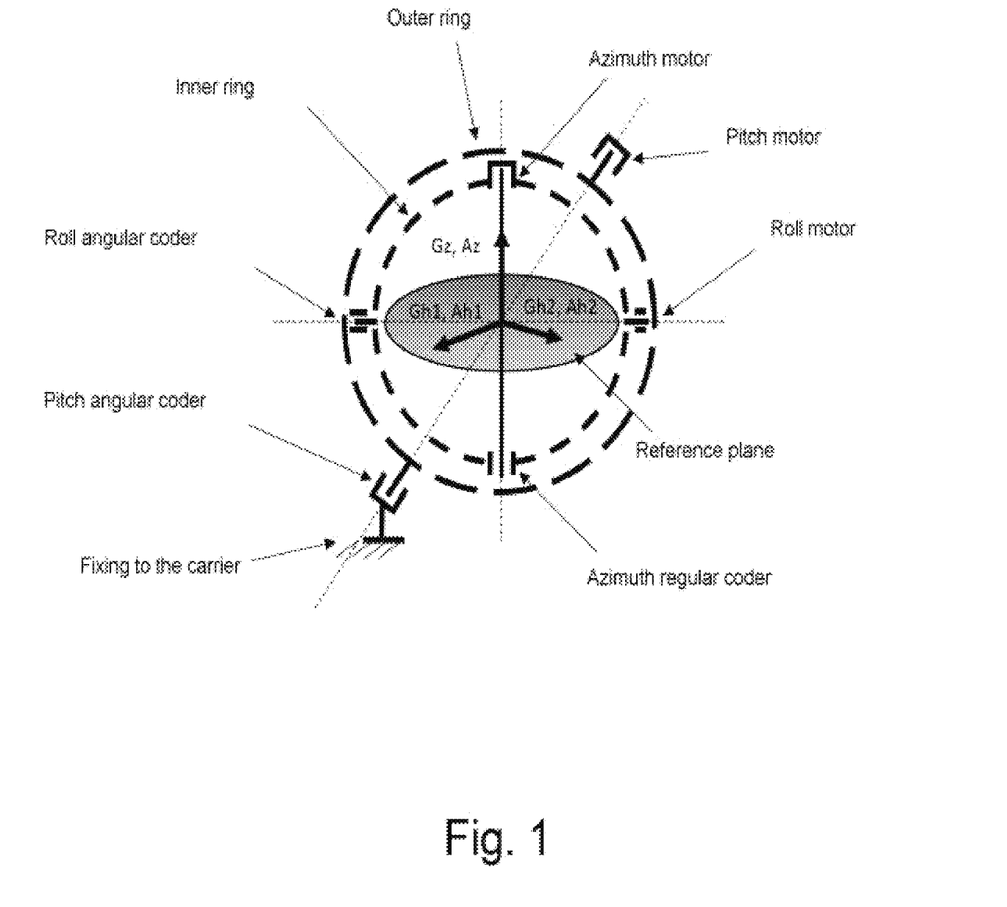

FIG. 1 presents an example of a platform in a structure with three gimbal axes, known from the prior art and for which three gyroscopes or gyrometers and three accelerometers are used. Such a platform can naturally be used to implement the invention.

A configuration with a fourth gimbal axis creating a redundancy on the roll axis is generally used for applications with high dynamic range, as for example for airplanes.

Such a configuration makes it possible to have a redundancy of information, either with the roll axis, or with the azimuth axis, said redundancy allowing the carrier to perform movements for which, at any moment, the gimbal axes are not aligned on directions which are theoretically prohibited to them, like a roll axis for example which could be confused with the local vertical during an airplane loop.

However, the three-axis configuration presented here is sufficient to understand the invention described in this document, an invention whose scope can easily be extended to redundant systems.

In the illustration of FIG. 1, Gh1, Gh2, Ah1, Ah2 are, respectively, the gyroscopic sensors and the accelerometers defining the reference plane of the system. Gz and Az are, for their part, respectively the gyroscopic sensor and the accelerometer linked to the axis at right angles to the reference plane or azimuth or vertical axis.

The gyroscopes make it possible to control the angles of the gimbals using azimuth, roll and pitch motors, so as to stabilize the trim and the azimuth of the core which thus becomes insensitive to the movements of the carrier and the accelerometers make it possible to correct the horizontality of the axes 1 and 2 forming the reference plane by generating rotation commands intended for the gyroscopic sensors, gyroscopes or gyrometers.

The axes of the gimbals are equipped with angular coders and with electrical links allowing the passage of the signals either by revolving contacts, or by flexible links in the case of limited travels (generally on the pitch axis, but also on the roll axis for the inertial navigation systems used on ships), or any other suitable technological means limiting the friction torques to the strict minimum.

The information returned by these angular coders is in particular used to compute the projections of the information from the sensors of the core to the gimbal motors through networks of servocontrol chains stabilizing the core and to deliver the trim of the carrier, as well as its heading, for piloting purposes for example.

One of the main functions performed by the inertial systems is to define a heading relative to the geographic north.

According to the prior art, the gyroscope Gz makes it possible to rotate the core about the azimuth axis for, for example, Gh2, Ah2 to be oriented to the north.

In this case, Gh1 detects a projection of the Earth's rotation that is zero since it is oriented to the east or to the west, and any deviation makes it possible to correct the error of orientation to the north.

However, the performance obtained is directly linked to the drift of Gh1.

Similarly, Ah1 and Ah2 make it possible to orient the axes in the reference plane and any accelerometric bias provokes an error.

The measurement error of Ah1 provokes a spurious projection of the vertical component of the Earth's rotation which thus generates an error of orientation to the north.

The performance of the system is therefore, among other things, linked to the residual drift of the gyroscope Gh1 and to the residual false zero of the accelerometer Ah1 that are assumed oriented to the east.

The noise of the sensors is generally characterized by the curve of the Allan variance. This curve relates to the standard deviation or the variance of the noise as a function of the observation time horizon.

Figure 2:
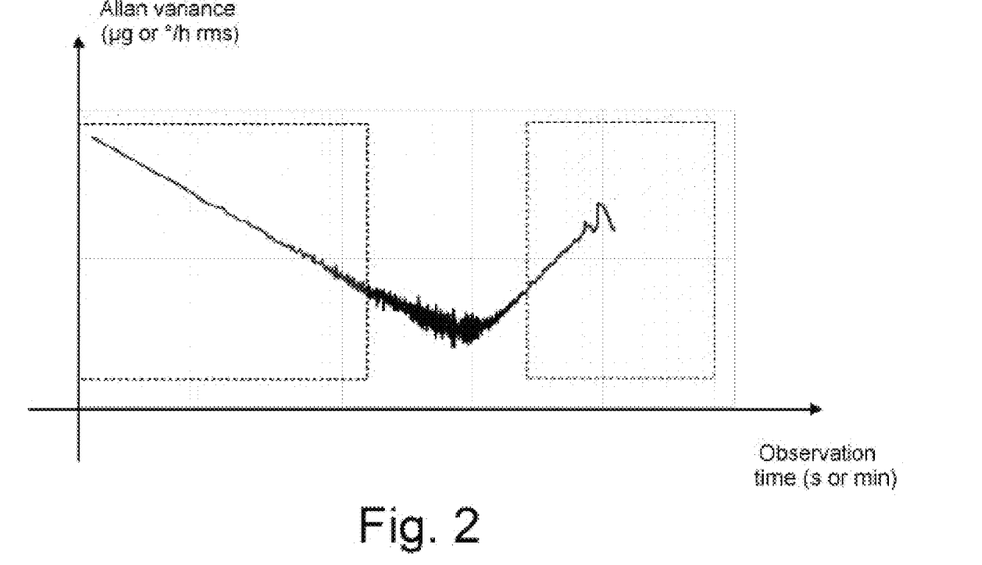
FIG. 2, an example of an Allan variance curve.

FIG. 2 is an example of an Allan variance curve obtained for inertial sensors in general.

As FIG. 2 illustrates, the Allan variance varies as a function of the observation time and includes a characteristic dip commonly called dip or low point of the Allan variance.

The instabilities observed to the right of the dip, and therefore for long observation times, are generally the result of the sensitivity of the sensors to the temperature and to the fluctuations thereof over time.

Generally, one or two orders of magnitude are observed between the value reached at the low point and the asymptotic value reached for very long times.

The RLG or FOGs used on high-performance navigation systems have an asymptotic value at the long times close to 0.01 degrees per hour.

The mid-range of gyroscopes of tactical class, for its part, achieves 1 to 10 degrees per hour for these same times and cannot therefore realistically be used to produce top-end navigation systems. The same applies for accelerometers.

One feature of the invention consists, in a novel manner, in exploiting this low point which appears for a determined observation time characteristic of the type of sensor considered, instead of exploiting the properties of the sensors observed for the long times as in the systems according to the prior art.

Thus, if P designates the sensor performance, in terms of stability, that it is necessary to maintain to obtain a top-end navigation system, a few 0.01 degrees per hour or 100 micro g for example, sensors the low point of the Allan variance of which is consistent with this value become eligible for this use, this qualifying some of the sensors belonging to the tactical mid-range by virtue of what has been stated previously.

Figure 3:
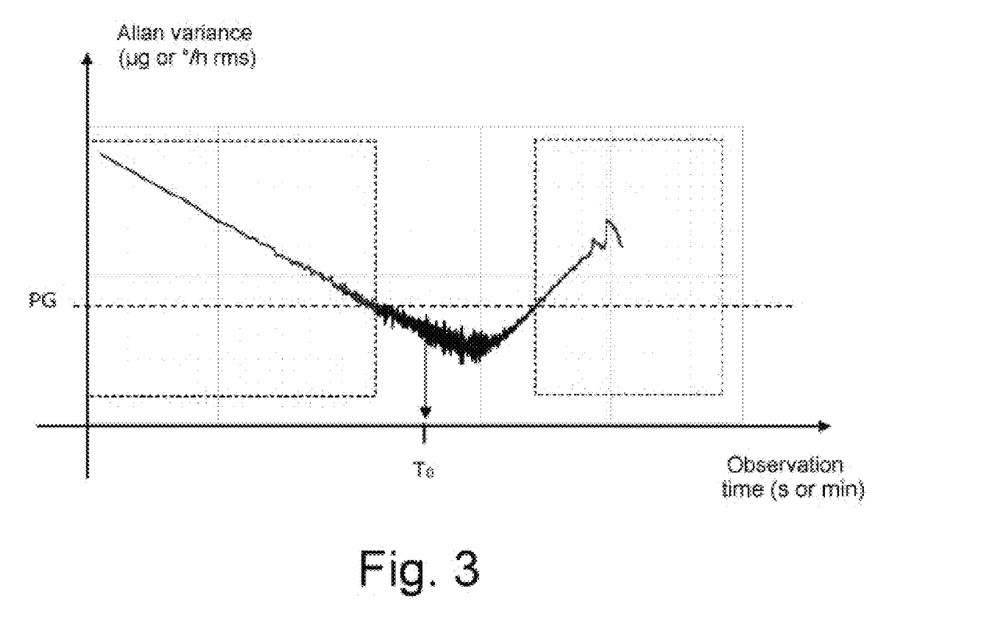
FIG. 3, an illustration of the principle of determination of the speed of rotation imposed on the core, in accordance with the invention.

For that, the vertical gyroscope Gz is used to drive the core in rotation about the vertical axis, at a speed of revolution $\Omega_0$ consistent with an observation period $T_0$ situated, as FIG. 3 illustrates, in the zone of the dip of the variances of the sensors. $\Omega_0$ is defined by the following relationship:

$$\Omega_0[rad/s] = k \times 2\pi T_0$$

The value of the parameter k is optimized for the system to meet its specifications in terms of estimation of the angle to the geographic north and of estimation of the latitude and of the local longitude of the carrier.

As FIG. 3 illustrates, the intersection of PG with the Allan variance curve of the gyroscopes Gh1 and/or Gh2 supplies an observation time window within which the value of T0 is preferentially chosen. PG represents the highest value of the Allan variance that makes it possible to obtain the desired accuracy of determination of the geographic north. This window corresponds to the range for which the variance is sufficiently low to obtain the inertial performance levels sought.

Other values of $T_0$ are also possible depending on the level of performance and the type of optimization that are desired.

Without this being exclusive, the output of Gz is, preferentially, servocontrolled on $\Omega_0$, which means that the absolute speed of the rotation of the core about the vertical axis in the Galilean sense is equal to $\Omega_0$.

Figure 4:
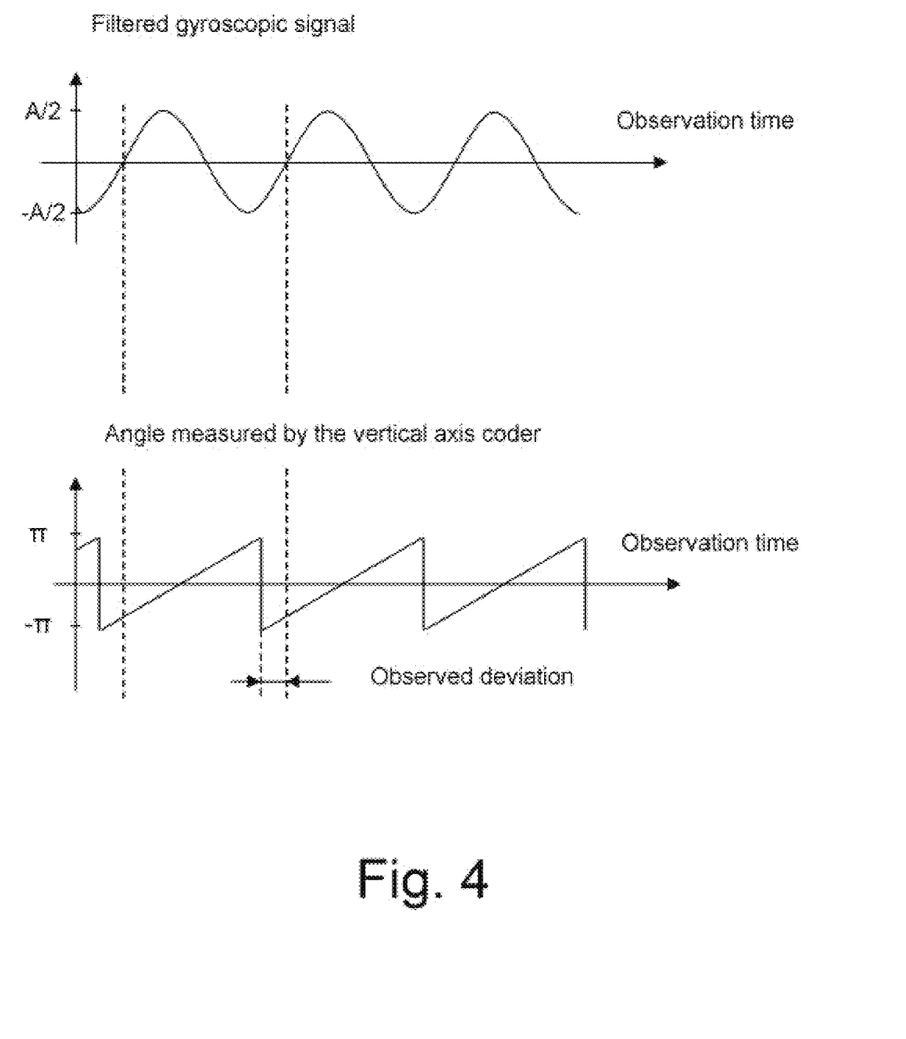
FIG. 4, two curves respectively illustrating the form of the signals from a gyroscopic sensor arranged in the reference plane and from an angular coder arranged on the axis at right angles to the reference plane of the core.

FIG. 4 presents two curves respectively illustrating the form of the signals from a gyroscopic sensor arranged in the reference plane and indicating the variation of angular position measured by the sensor when the core rotates and an angular coder arranged on the axis at right angles to the reference plane of the core, the signal representing the variation of angular position measured by this coder, relative to a given reference axis, the reference axis of the gyroscopic sensor for example.

These curves illustrate the fact that the information delivered by the sensors of the reference plane of the core is carried by amplitude-modulated electrical signals with a period corresponding to the speed of rotation of the core, with a maximum amplitude that is a function of the latitude considered.

For example, the outputs of the gyroscopic sensors Gh1 and Gh2, assuming these sensors to be of sufficient accuracy to measure the Earth's rotation, are sinusoids having an amplitude equal to the value of the Earth's rotation at the latitude considered.

Consequently, the observation of these modulated signals makes it possible, by measuring the temporal phase of these signals and the temporal deviation which separates them, in particular at the instants when the signal supplied by the coder arranged on the axis at right angles to the reference plane (azimuth rotation axis) crosses the time axes (zero-crossing), to compare the directions pointed to upon passing the North, South, East and West cardinal points with the directions indicated by the angular coder of the azimuth axis. The measurement of the deviations makes it possible, through the implementation of a simple mathematical processing of filtering type for example, to determine a heading with a very low error.

Performance levels enhanced by several orders of magnitude are thus obtained, deriving not from the use of sensors having an exceptional intrinsic stability, but from use of predictable, and easily reproducible, physical characteristics.

The principle of the invention therefore consists in filtering the signal delivered by the gyroscopic sensor considered, a sinusoidal measurement signal embedded in the general noise of the sensor, by digital filtering for example, the filter implemented being a bandpass filter centered on the period of rotation of the core. Such a filtering advantageously makes it possible to eliminate the noise situated outside of the band of interest such that the signal obtained is a sinusoidal signal affected by a residual noise corresponding to the drift of the sensor over time; this noise being all the lower when the frequency of the sinusoid is close to the dip of the Allan variance and this dip is low.

In other words, the principle implemented in the context of the invention consists in using the rotation of the core to dispense with the out-band noise of the sensors while the in-band noise which cannot be filtered by a passband is simply minimized by the choice of the operating point linked to the form of the Allan curve.

This principle of operation can be implemented by using various types of inertial systems with a core comprising a greater or lesser number of degrees of freedom compared to the carrier, inasmuch as the rotation of the core about an axis at right angles to its reference plane, defined by two gyroscopic sensors, oriented along two distinct axes can be performed, and it is possible to have the angular measurement performed by the coder measuring the rotation of the core about this axis.

Different possible variants of the device can of course be envisaged depending on the costs and performance levels desired, with a reduced number of sensors or, for example, with the use of different gyroscope or gyrometer technologies as well as with different accelerometer technologies. By virtue of the principles explained previously, these different variants have in common the fact that they make it possible to obtain a powerful system using sensors of average performance.

It is thus possible to mix these technologies and in some cases, within one and the same technology, to mix gyroscope or gyrometer according to the advantages which result therefrom.

It is also possible to use a gyroscopic sensor as gyroscope up to a certain frequency and as gyrometer beyond.

It is likewise possible not to impose a continuous rotation, on the azimuth axis, at right angles to the reference plane, but an alternate rotation, a rotation of trapezoidal form for example, for which the movement about the vertical axis is reciprocal rotation with a predefined angular movement, so as to prioritize the times of observation of an axis of the reference plane along the East-West axis or a discrete number of predefined axes, for example the East, West, North and South axes.

It is, moreover, possible to envisage a large number of variant rotation modes, the continuous rotations or rotations of trapezoidal forms described above being particular cases.

The damping of the Schuler oscillation which, as is known, disrupts the stability of the trim of the core and the information delivered by the inertial unit can be performed using external speed information such as the GPS, the log, the odometer, the Doppler radar or the anemometer. External accelerometers also make it possible to determine this damping.

If all of the variants described previously are considered, it can be seen that it is thus possible, by virtue of the rotation of the core, to produce a minimum system according to the invention by using a single accelerometer in the core arranged in the reference plane.

However, a second accelerometer arranged in this same plane and at right angles to the first can be used, as well as a third accelerometer arranged at right angles to the reference plane, that is along the azimuth axis.

Moreover, one, two or three accelerometers can be arranged outside the system so as to produce the damping of the Schuler oscillation, as a function of the number of accelerometers arranged on the core and according to the quantity of information delivered by the system, for example attitude, heading and navigation.

Likewise, only an angular coder arranged on the vertical axis is necessary for a system whose function is reduced to supplying a heading, as for a gyrocompass for example. However, the presence of angular coders on the pitch and roll axes (see FIG. 1) can be envisaged in the case where the system operates as a heading and attitude system.

The taking into account and the processing of the information such as the heading or the attitude, commands generated by the accelerometer or accelerometers of the system arranged in the reference plane, can also make it possible to define the position and the speed of the carrier as in the case of a navigation system.

A single gyroscope or gyrometer with input axis oriented along the reference plane, used for its low Allan variance point compatible with the accuracy desired for the navigation system, is essential to obtain an observation of the rotations in the horizontal plane that is powerful in the long term.

A second gyroscope or gyrometer with input axis oriented along the reference plane and arranged at right angles to the first is necessary to ensure a short-term control of the orientation of the core along the horizontal plane. However, its stability performance may be lower.

Likewise, it is not essential to produce a trihedron of sensors according to right angles, and different configurations are possible provided that they make it possible to reconstitute the movements in the three dimensions.

When the sensors assumed horizontal are not at right angles to the vertical sensor, they detect, in addition to the rotations of the core about the horizontal plane, the projections of the rotation of the core on the vertical axis.

This option can be advantageous to reduce certain defects specific to certain sensor technologies: blind zone of laser gyroscopes or average of the drifts of the vibrating gyroscopes for example.

This approach falls, naturally, within the scope of the present invention, inasmuch as, even if this injection of continuous rotation produced by the projection of the rotation on the azimuth axis contributes to the lowering of this low point by reducing these apparent specific defects, the low point of the Allan variance is nevertheless exploited for what it brings by right.

Embodiments are also possible which are based on the principle of rotation or of oscillations defined by the invention and for which the roll and pitch axes of the platform with gimbals are fixed or eliminated and for which the core rotates only about its azimuth axis.

In this case, it is possible to use the modulated information delivered by the sensors borne by the core, gyroscopic sensors and accelerometer(s), to reconstitute a virtual platform and thus to revert to the case of a platform for a navigation system.

Finally, embodiments are also possible which are based on the principle of rotation or of oscillations defined by the invention and for which a revolving plate bearing the core is fixed to the azimuth axis of a conventional platform with gimbals.

That then is a four-axis configuration, with redundant azimuth axis. In this case, it is possible to use the information from the sensors borne by the revolving plate to reconstitute all the information necessary to the system from the signals from the sensors modulated by the rotation or the oscillations of the plate applied to the core.

By virtue of the principles explained previously, this makes it possible to obtain a powerful system using sensors of average performance.

A typical exemplary embodiment of the present invention consists in using a core mounted on a gimbal system with three axes, comprising three gyroscopic sensors, gyroscope or gyrometers, whose measurement axes are oriented according to an orthogonal trihedron, the system being provided with means to keep the reference plane of the core in the horizontal plane. In this way, the axis at right angles to the reference plane is kept vertical.

The core also comprises at least one accelerometer whose measurement axis is at right angles to the vertical axis and contained in the reference plane.

This assembly thus constitutes a core of inertial sensors (gyroscopic sensors and accelerometer(s)) borne by three axes of gimbals, of which one axis is inertially rotated based on the measurement supplied by the vertical gyrometer. The frequency of rotation about the vertical axis is chosen such that, over approximately one period of rotation, the short-term instabilities of the drift of one of the two gyrometers defining the reference plane (coinciding with the horizontal plane) is minimal.

The measurement obtained from the accelerometer makes it possible to supply information which is used to keep the core on a horizontal trim while the carrier is moving.

The information obtained from the two gyroscopic sensors defining the reference plane, take the form of signals modulated by virtue of the action of the horizontal component of the Earth's rotation on these two sensors whose measurement axes are placed horizontally. They make it possible to identify an orientation relative to the geographic north.

The angular sensors (coders) borne by the gimbal axes, for their part, supply information which makes it possible to deliver information on the heading and attitude of the carrier.

The information supplied by the gyrometers thus makes it possible to establish the latitude of the carrier and the information supplied by the accelerometer makes it possible to establish the local longitude.

The invention claimed is:

1. An inertial navigation system of a carrier, comprising:
a core mounted on a tri-axial gimbal system occupying a fixed position relative to the carrier, said core comprising gyroscopic sensors making it possible to determine the angular velocity thereof according to three axes defining a reference trihedron, two of the axes defining a reference plane and the third axis being chosen to be at right angles to said reference plane,
wherein said inertial navigation system further comprises command and control means configured on the one hand to rotate the core continuously or alternately about the third axis and on the other hand to exploit the information supplied by the gyroscopic sensors as well as that supplied by an accelerometer placed in the duly defined reference plane, so as to keep the reference plane of the core in a given attitude relative to the horizontal plane or at least to be able to determine the attitude of the reference plane relative to the horizontal plane and so as to determine the direction of the geographic north in the reference frame formed by the axes defining the reference plane; the continuous or alternate rotation being performed according to a determined period, the value of said period being defined in such a way that, for an observation time equal to this value, the value of the Allan variance of the stability error of the gyroscopic sensors is lower than a given value defined on the basis of the desired accuracy of determination of the geographic north.

2. The inertial navigation system of a carrier as claimed in claim 1, wherein the command and control means are configured to exploit the information supplied by the gyroscopic sensors as well as that supplied by an accelerometer placed in the reference plane, so as to determine the attitude of the carrier, its geographic coordinates of longitude and of latitude and of altitude, as well as its speed vector.

3. The inertial navigation system of a carrier as claimed in claim 1, wherein the gyroscopic sensors comprise gyroscopes and/or gyrometers.

4. The inertial navigation system of a carrier as claimed in claim 1, wherein the two gyroscopic sensors defining the reference plane are oriented according to two right-angled axes such that the duly formed reference trihedron is a trirectangular trihedron.

5. The inertial navigation system of a carrier as claimed in claim 1, wherein the command and control means are configured so as to keep the reference plane of the core in the horizontal plane, such that the third axis of the reference trihedron is directed vertically.

6. The inertial navigation system as claimed in claim 1, in which one or two axes of gimbals are immobilized in rotation, only the third axis being equipped with an angular coder.

7. A method for ensuring the inertial navigation of a carrier having an inertial navigation system itself having a core mounted on a tri-axial gimbal system occupying a fixed position relative to the carrier, said core having gyroscopic sensors making it possible to determine the angular velocity thereof according to three axes defining a reference trihedron, two of the axes defining a reference plane and the third axis being chosen to be at right angles to said reference plane, said method comprising the steps of the core being rotated continuously or alternately, according to a determined period, about the third axis; the continuous or alternate rotation being performed according to a determined period, the value of said period being defined in such a way that, for an observation time equal to this value, the value of the Allan variance of the stability error of the gyroscopic sensors is lower than a given value defined on the basis of the desired accuracy of determination of the geographic north; the information supplied by the gyroscopic sensors as well as that supplied by an accelerometer placed in the reference plane being exploited so as, on the one hand, to keep the reference plane of the core in a given attitude relative to the horizontal plane or at least to be able to determine the attitude of the reference plane relative to the horizontal plane and so as, on the other hand, to determine the direction of the geographic north in the reference frame formed by the axes defining the reference plane.

8. The method as claimed in claim 7, wherein, to determine the attitude of the reference plane relative to the horizontal plane and to determine the direction of the geographic north in the reference frame formed by the axes defining the reference plane, the following operations are performed:

acquisition of the modulated information delivered by the inertial sensors whose measurement axes are situated in the reference plane and the information supplied by an angular coder coding the rotation of the third axis;

generation of commands driving the gimbal motors at right angles to the third axis, so as to determine and control the trim of the reference plane and so as to rotate the third axis on the basis of the information from the gyroscopic sensor borne by this axis, said commands being generated on the basis of said information projected using matrices in the axes of rotation of the gimbals;

determination of the phase and of the amplitude of the modulation of the signals delivered by the gyroscopic sensors and the accelerometer whose measurement axes are situated in the reference plane, the phase of the modulation defining the information on angle of orientation of the measurement axes relative to the geographic north, the amplitude of the modulation defining the information on the angle of the local latitude, the velocities according to the local meridian as well as the local parallel and, by integration, the movements in these directions;

computation of the trim of the carrier, based on the data from the angular coders of the gimbal axes.

* * * * *